April 7, 1942.　　　J. F. TAPLIN　　　2,278,805

RATE OF CLIMB METERS

Filed Dec. 22, 1939　　　2 Sheets-Sheet 1

INVENTOR:
John F. Taplin,
BY
ATTORNEY.

April 7, 1942.   J. F. TAPLIN   2,278,805
RATE OF CLIMB METERS
Filed Dec. 22, 1939   2 Sheets-Sheet 2
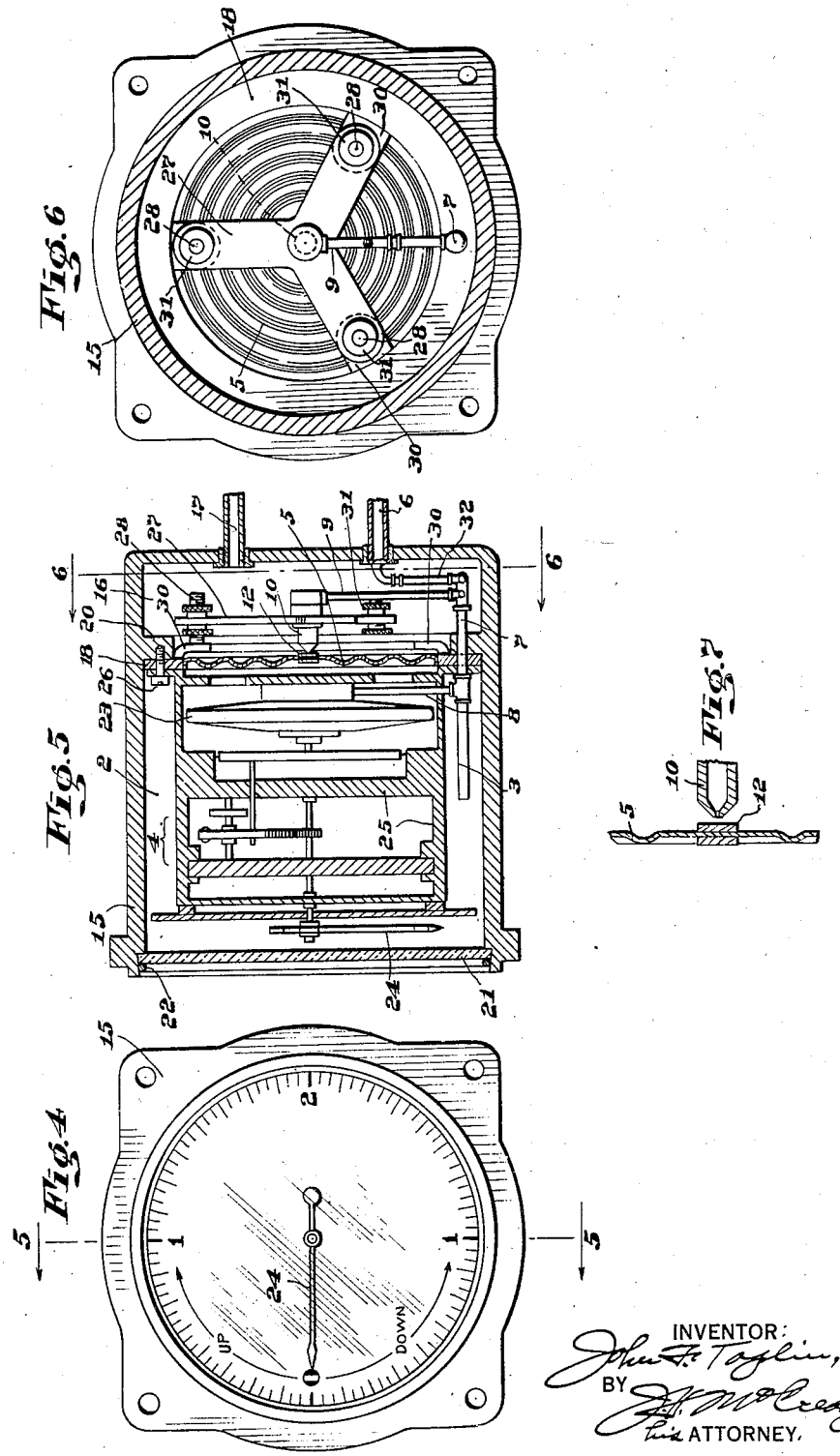
INVENTOR:
John F. Taplin,
BY
ATTORNEY.

Patented Apr. 7, 1942

2,278,805

UNITED STATES PATENT OFFICE 2,278,805

RATE OF CLIMB METERS

John F. Taplin, Foxboro, Mass.

Application December 22, 1939, Serial No. 310,497

7 Claims. (Cl. 73—179)

This invention relates to instruments designed primarily to measure the vertical speed of an airplane. They are commonly referred to as "rate-of-climb" meters.

Instruments of this type depend fundamentally on the fact that atmospheric pressure decreases with an increase in altitude, and vice versa. The conventional type of instrument of this character comprises a chamber closed except for a capillary tube or equivalent means providing restricted communication with the outside atmosphere. As this chamber is carried through a change in elevation, a flow of air, either into or out of the chamber, is produced by the natural tendency for the pressure inside the chamber to equalize with that outside. The rate of flow of air through the tube, if of proper dimensions, will be substantially proportional to the rate of change of the atmospheric pressure. Consequently, means is provided to measure this rate of flow continuously and it is calibrated to indicate the rate of climb or descent of the airplane.

All of the prior art rate-of-climb meters of which I have been able to learn, have been built on this principle. It is well understood, however, that such meters involve a dynamic error of very considerable magnitude. Specifically, they are sluggish in their action, with the result that when a pilot is maneuvering a plane through rapid changes in elevation, the instrument may indicate a climb at the very moment when the plane is beginning to dive, or vice versa.

To eliminate such dynamic error constitutes the chief object of this invention. It involves a novel instrument.

The nature of the invention will be readily understood from the following description when read in connection with the accompanying drawings, and the novel features will be particularly pointed out in the appended claims.

In the drawings,

Fig. 4 is a front view of an instrument constructed in accordance with this invention;

Fig. 5 is a vertical, partial section approximately on the line 5—5, Fig. 4;

Fig. 6 is a vertical, sectional view approximately on the line 6—6, Fig. 5; and

Fig. 7 is a detail sectional view of the valve operated by the diaphragm.

Figure 1:
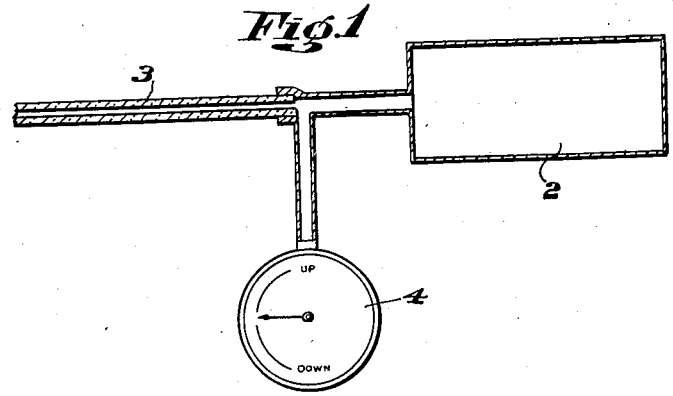
Figure 1 is a diagrammatic view illustrating the principle on which prior art forms of rate-of-climb meters have been based.

Referring first to Fig. 1 which illustrates the principle upon which conventional rate-of-climb meters are constructed, 2 indicates a chamber closed except for communication with the outside atmosphere through the capillary tube 3. A pressure gage 4 is connected with the end of the tube 3 adjacent to the chamber. It is responsive to the difference in pressure at the two ends of the capillary tube and thus measures the pressure drop across the tube. The instrument depends for its operation upon this small pressure differential amounting only to, say, approximately the equivalent in pressure of an inch of water for a rate of climb of two thousand feet per minute. The chief cause of dynamic error above referred to is the fact that even this small pressure drop across the capillary tube introduces an undesirable lag action in the functioning of the instrument. While it is true that if the capillary tube, or any other pressure difference generating element, is correctly designed, the pressure drop across it is functionally related to the rate of flow of air through it, still the pressure differential creating such flow must be of such small magnitude that a very delicate pressure gauge must be employed. Even under these circumstances the presence of the small pressure drop across the capillary prevents the instrument from accurately responding to sudden changes in altitude.

The present invention proposes to overcome the objections to former instruments of this character and to eliminate their limitations as to responsiveness by utilizing an external source of energy to drive the flow responsive device. Such additional energy must be applied through some type of controller. The best method of accomplishing this object which I have so far devised involves the application of an artificially created air pressure, either above or below atmospheric, in such a manner that is is utilized for operating purposes but is constantly under the control of the pressure differential existing at any time between the external air and that in said chamber. In this manner the effect of the dynamic error inherent in prior instruments is made negligible, the response of the instrument to changes in altitude becomes approximately synchronous with those changes, and both the accuracy of the instrument and its usefulness to the pilot are materially improved.

Figure 2:
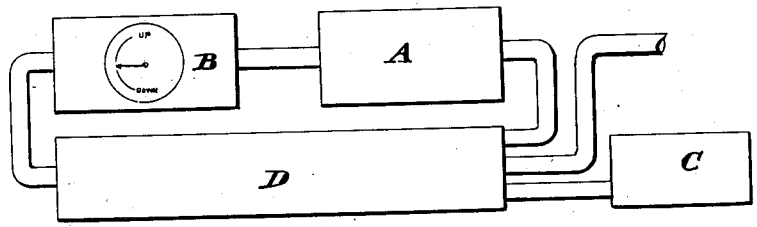
Figs. 2 and 3 are views showing diagrammatically the general organization of a meter embodying the present invention.

An organization designed in accordance with the foregoing is indicated in the block diagram shown in Fig. 2 in which the closed chamber is shown at A, a flow responsive element at B, the external source of energy at C, and a pressure responsive controller governing the application of such external energy to the other parts of the instrument at D.

Figure 3:
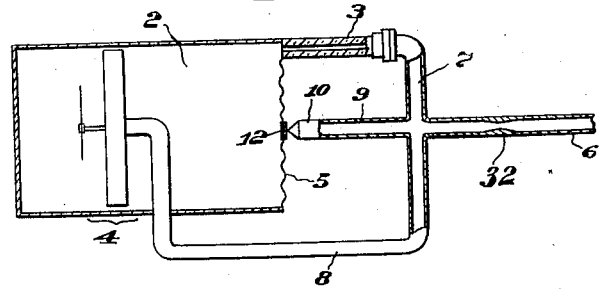

A more specific form of such an organization is shown in Fig. 3 in which the numerals used in Fig. 1 are employed to designate corresponding parts. Here a type of instrument is shown which utilizes an external source of vacuum to drive the mechanism. In this arrangement one end of the chamber 2 is closed by a flexible diaphragm 5, the opposite sides of which thus are subjected to the air pressures in the chamber 2 and in the surrounding atmosphere, respectively. The source of artificially created vacuum is connected with the instrument through a tube 6, containing a restriction 32, at the end of which a three-way connection is provided, one branch, 7, leading to the capillary tube, another, 8, to the interior of the diaphragm which operates the gauge 4, and a third, indicated at 9, serving to conduct air from a valve comprising a nozzle 10 at the end of the tube 9 and a disk or baffle 12 mounted on the diaphragm and responsive to the movements of said diaphragm to open or close the orifice at the end of the nozzle. Thus the diaphragm, the restriction and the valve form the controller for governing the application of pressure from the external source of energy to the instrument. Preferably the artificially created pressure here utilized is the vacuum pressure normally maintained in an airplane in connection with the operation of gyroscopic apparatus with which it is equipped. A common arrangement for creating such a vacuum consists in positioning an open-ended tube or a venturi so as to utilize the forward movement of the plane for this purpose. A negative pressure of approximately three inches of mercury can readily be produced in this manner, and such a pressure is commonly available at the instrument board of an airplane.

Assuming that such an instrument as that indicated in Fig. 3 is properly installed on a plane and it begins to rise, the resulting drop in external air pressure will cause the higher pressure in the chamber 2 to deflect the diaphragm 5 toward the right, thus preventing, or at least reducing, the intake of air through the nozzle 10. This reduction in the flow of air into the nozzle and through the restriction 32 in tube 6 likewise reduces the pressure drop across the capillary tube 3, thus increasing the vacuum of the air at the left of the restriction, and similarly in tubes 7, 8 and 9. This increased vacuum tends to draw air from chamber 2 through the capillary tube 3 and out to the vacuum source. The rate of flow of air through the tube 3 is accompanied by a corresponding pressure drop, as indicated on the gauge 4. If this gauge is properly calibrated it will indicate the rate of climb.

It should be observed that the flow through the capillary tube tends to make the difference between the pressure in chamber 2 and the surrounding atmosphere equal to some preselected constant amount, and such flow occurs only when the difference between these two pressures is not equal to this constant amount. Consequently, when the plane levels off, this difference in pressure is present, the diaphragm 5 returns to its neutral position, and a state of equilibrium occurs and is maintained until another change in elevation is produced. If, now, the plane starts to descend, the rise in external air pressure deflects the diaphragm 5 to the left, thus increasing the opening of the valve 10—12 and causing an increased flow of air from the atmosphere through the restriction 32 in tube 6 to the vacuum source. This added air flow increases the pressure drop across the restriction, producing a decrease in the vacuum at the left of the restriction and in the conduits 7, 8 and 9. Under this condition the decreased vacuum or increased pressure in tube 7 causes the air in the tube to be at a higher pressure than the "equilibrium" pressure in chamber 2, with the result that part of the air entering the nozzle and flowing through tube 9 also flows through tube 7 and the capillary tube 3 into the chamber 2, until the pressure difference between the chamber and the atmosphere is again equal to the preselected constant amount. It will be observed that in the above case the effect of the air flowing in the opposite direction through the capillary is to give an indication on the gauge of descent and the rate of such descent.

It should be pointed out that the action of the controller, as described above, is continuously readjusting the back pressure of the nozzle (pressure in tube 9) to maintain the desired equilibrium conditions at each instant.

An instrument organized in accordance with Fig. 3 is shown in considerable detail in Figs. 4 to 7, the numerals used in Fig. 3 being also applied in Figs. 4 to 7 to designate corresponding parts. Referring to the latter figures it will be seen that the instrument there shown includes a casing 15 divided by the diaphragm 5 into two chambers, one corresponding to the chamber 2, Fig. 3, and the other chamber 16 being open to the external atmosphere through an aperture or, more preferably, through a static tube 17. This tube is like the static tubes used in connection with the air speed meter, altimeter, and other instruments to maintain atmospheric pressure in a closed chamber while avoiding the effect on that pressure that otherwise would be created purely due to the motion of the plane regardless of whether that motion is level, up or down. The diaphragm may conveniently be mounted by soldering or otherwise securing its margin to a flat ring 18 and clamping this ring to one side of an annular rib 20, integral with the casing and projecting inwardly therefrom. A gasket (not shown) should be interposed between these parts to seal the chamber 2 at this end. At its opposite end it is closed by a glass plate 21 also sealed by means of a gasket or cement and held in place by a snap ring 22.

The pressure gauge 4 preferably, for manufacturing convenience, consists of a gauge assembly of any suitable commercial form and of a rating or capacity suited to the requirements of this invention. Since the pressure used probably will not be greater than the equivalent of an inch, or perhaps an inch and a half of mercury above and below a zero position, the gauge should be adapted to operate accurately over this three inch pressure range. In this gauge the belows is shown at 23 and the pointer at 24, the intervening motion transmitting mechanism being like that used in gauges of this general type. All of these parts are assembled on a frame 25 so that this entire gauge mechanism can be placed in, or removed from, the casing 15 as a unit. It may be held in place by the same screws which secure the ring 18 to the flange 20, one of these screws being shown in Fig. 5 at 26.

The connections between the tube 6 and the elements 3, 4 and 10 are essentially as shown in Fig. 3, except that in this instance the tube 8 leading to the gauge bellows extends laterally from the tube 7. This, however, is an immaterial change. The nozzle 10 is mounted centrally on a spider 27, best shown in Fig. 6, the three legs of this spider having holes drilled through them near their ends to receive screw-threaded studs 28 which are anchored securely in lugs 30 formed integral with the ring 18. Nuts, such as those shown at 31, are mounted on these studs both above and below the spider arms, so that by adjusting these nuts the spider may be accurately positioned in a plane parallel to the general plane of the diaphragm and also in the desired lateral relationship thereto.

The adjustment just described is useful in producing a desirable degree of initial bias of the diaphragm. Assuming, for example, that the vacuum available is three inches of mercury, the preferred arrangement would be to make the zero position of the diaphragm correspond to an inch and a half of mercury, and to utilize one inch of mercury pressure for the full scale "up" reading and another inch for the full scale "down" reading, thus leaving a half inch of available pressure as a safety factor at opposite ends of the pressure range utilized. The adjustment of the nozzle 10 required to establish this operating condition may readily be effected by suitably manipulating the nuts 31 to move the nozzle 10 inwardly, or toward the left, Fig. 5, with reference to the diaphragm, by that amount necessary to make its zero position correspond to the pressure equivalent of an inch and a half of mercury below atmospheric pressure.

In this equilibrium position the pressure in the chamber 2 is biased below atmospheric pressure by an inch and a half of mercury, and due to the action of the controller, as above described, the vacuum producing apparatus, whatever its nature, will maintain this vacuum in the chamber at all times. The pointer 24 is adjusted so that it reads zero when the plane is in level flight. If the external atmospheric pressure diminishes due to a change in altitude of the plane, the pressure in the atmospheric chamber 16 diminishes in synchronism with it. Immediately the diaphragm 5 is deflected to the right of its mean operating position, the flow of air into the nozzle and to the vacuum source is diminished. As previously explained this reduced air flow results in a decreased pressure drop across restriction 32, or increases the vacuum in conduits 7, 8, and 9. Under this condition this vacuum is greater than that in chamber 2 and air is drawn from the chamber through the capillary tube 3 to the vacuum source. As above explained, such a flow of air is registered by the pointer 24, indicating a rate of rise dependent upon the rate of air flow through the tube 15. Such flow will continue until the pressure in the chamber 2 is at the correct "biased" value below that pressure in chamber 16, and then the diaphragm returns to its mean operating position. On the other hand, if the atmospheric pressure should rise in the chamber 16 to a value above that in the chamber 2, a reversal of the operations just described would take place and the needle 24 would indicate a rate of descent.

It should be observed that while the external source of energy is utilized in producing the flow of air in one direction or the other through the capillary tube as may be necessary to maintain a balanced pressure relationship between the chambers 2 and 16, nevertheless such flow occurs only in response to a difference in the pressures in said chambers which tends to disturb that balance and deflects the diaphragm. This element and the valve 10—12 and restriction 32, which form the controller, so govern the application of the artificially created pressure to the gauge as to correct any difference in the pressures in the chambers 2 and 16, except for the desired bias above referred to, and to restore equilibrium promptly when it has been destroyed for any reason. It will also be understood that this bias is necessary when either a negative or a positive pressure only is available. Without some such bias established either by pressure, as here proposed, by a spring, or in some equivalent manner, it would be necessary to use a positive pressure to move the diaphragm in one direction and a negative pressure to deflect it in the opposite direction. Such a requirement necessarily would complicate the installation, although it could be used. An external source of pressure, however, presents the great advantage of producing a quick restoration of equilibrium when the latter has been disturbed by any change in altitude, so that the instrument responds practically instantaneously to changes in elevation of the plane. The rate of flow of the equalizing air currents through the capillary tube thus is made more vigorous, and higher pressure values are made available and are utilized in operating the gauge, in place of the extremely weak pressures which have necessarily been relied upon in prior instruments of this general character.

While the foregoing description may convey the impression that the deflection of the diaphragm is of substantial proportions and that the same is true of the time interval occupied in restoring the predetermined pressure conditions in the two chambers separated by the diaphragm when changes in altitude occur, this is not the fact. Actually the deflection of the diaphragm in instruments already built and successfully operated is probably less than a thousandth of an inch, and the time interval above referred to is a very small fraction of a second. These correcting operations are performed so rapidly that when the instrument is in use the diaphragm vibrates continuously.

Means for making the conventional corrections for temperature and density may be used in the instrument. The restriction tube 32 may be made, say, one inch long and may have a bore of .010 inch in diameter. The capillary tube 3 may be of a size similar to those used heretofore in rate-of-climb meters. A tube approximately one inch long with a bore of .008 inch operates satisfactorily. Or, instead of such a capillary tube an orifice or some other equivalent element which produces a measurable pressure drop in response to a flow of air may be used.

As pointed out above, the dynamic error, as characterized by the "time constant" of the instrument, may be reduced to a small fraction of the time constant of conventional meters, and at the same time a substantial pressure range is available to drive the instrument. In fact, by proper design of the movement between the baffle and nozzle the time constant may be made completely negligible. Under this condition the instrument is very quick to respond to extremely slight changes in altitude. On the other hand, it is desirable to introduce some damping action to prevent the instrument from responding to extremely sudden changes in static pressure—as caused by gusty air conditions. Since the effect of this damping action tends to increase the dynamic error, only a sufficient amount of damping action should be introduced to give just the desired steadiness of the instrument pointer. Furthermore, the amount of the damping action should be capable of adjustment from the exterior of the instrument so that the pilot may select the desired degree of steadiness under various atmospheric conditions.

One method of realizing this damping action is to insert a needle valve, or other form of variable resistance to air flow, in the conduit 8, Figs. 3 and 5, leading to the pressure responsive diaphragm 23. Arrangements should be made so that the valve stem may be readily adjusted to give any desired damping effect. The action of this added resistance is to retard the air flow into and out of the diaphragm cell 23, thus damping the pressure changes within the cell.

It will be observed that in this instrument ample pressure is available from the external source of vacuum to operate a pressure gauge of rugged and reliable construction. At the same time this pressure is so controlled and applied that the instrument responds promptly and accurately to changes in rate of climb. It has been found in actual practice that the instrument operates practically in synchronism with variations in altitude of an aircraft even when the latter is being maneuvered through rapid changes in elevation. Thus the invention effectually overcomes the objections above described to prior forms of rate-of-climb instruments.

While I have herein shown and described a typical embodiment of my invention, it will be evident that the invention may be embodied in other forms without departing from the spirit or scope thereof.

Having thus described my invention, what I desire to claim as new is:

1. An instrument for measuring the rate of change of altitude of an airplane comprising a casing having a chamber therein closed except for a passage through which restricted communication is provided with the outside atmosphere, a device responsive to the rate of flow of air through said passage, and additional means operative automatically in response to differences in air pressure in said chamber and that in the surrounding atmosphere for creating such a flow of air through said passage as to maintain a predetermined relationship between said pressures substantially continuously.

2. An instrument for measuring the rate of change of altitude of an airplane comprising a casing having a chamber therein closed except for a passage through which restricted communication is provided with the outside atmosphere, a device responsive to the rate of flow of air through said passage, and means for increasing such rates of flow automatically in response to differences in air pressures in said chamber and in the surrounding atmosphere.

3. An instrument for measuring the rate of change of altitude of an airplane, comprising a casing having a chamber therein closed except for a passage through which restricted communication is provided with the outside atmosphere, a device for indicating the instantaneous rates of flow of air through said passage, an artificially created source of air pressure, and means responsive automatically to differences in atmospheric pressure at said plane and that in said chamber for controlling the application of said artificially created pressure to said chamber.

4. An instrument for measuring the rate of change of altitude of an airplane comprising a casing having a chamber therein closed except for a passage through which restricted communication is provided with the outside atmosphere; a device for indicating the instantaneous rates of flow of air through said passage, an artificially created source of air pressure connected to said chamber, a diaphragm responsive to the differences in pressure in said chamber and that of the external atmosphere, and a valve controlled by said diaphragm and controlling the utilization of said artificially created air pressure in the operation of the instrument.

5. An instrument according to preceding claim 4, having a diaphragm so constructed as to maintain an initial bias of predetermined degree thereon.

6. An instrument for measuring the rate of change of altitude of an airplane comprising a casing having a chamber therein closed except for a passage through which restricted communication is provided with the outside atmosphere, a device for indicating the instantaneous rates of flow of air through said passage, an artificially created source of air pressure, and means for utilizing said source of air pressure to create a flow of air through said passage into and out of said chamber, as required to maintain a predetermined relationship between the pressure in said chamber and that in the external atmosphere.

7. An instrument for measuring the rate of change of altitude of an airplane comprising a casing having a chamber therein closed except for a passage through which restricted communication is provided with the outside atmosphere, a device for indicating the instantaneous rates of flow of air through said passage, an artificially created source of air pressure, a diaphragm responsive to the differences in pressure in said chamber and that of the external atmosphere, connections providing communication from said source of pressure with both said chamber and the atmosphere, and a valve controlled by said diaphragm and controlling the communication between the atmosphere and said source.

JOHN F. TAPLIN.